J. W. LAWTON.
SEED TESTER.
APPLICATION FILED JUNE 24, 1918.
1,295,530. Patented Feb. 25, 1919.
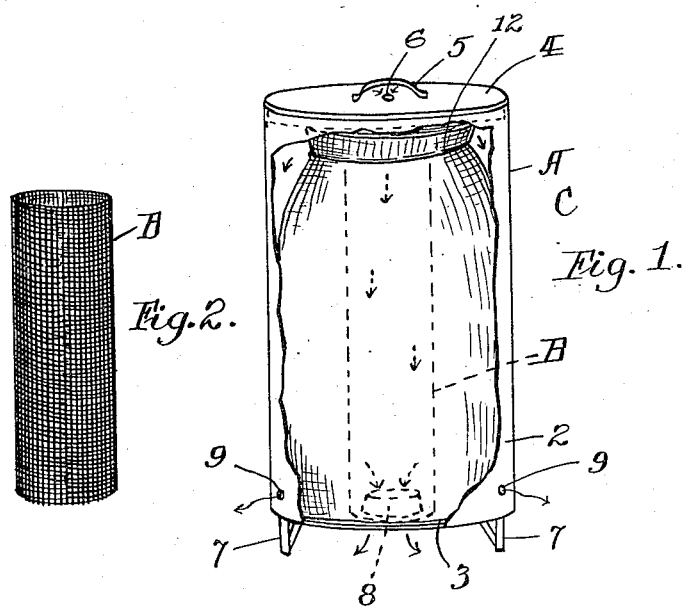
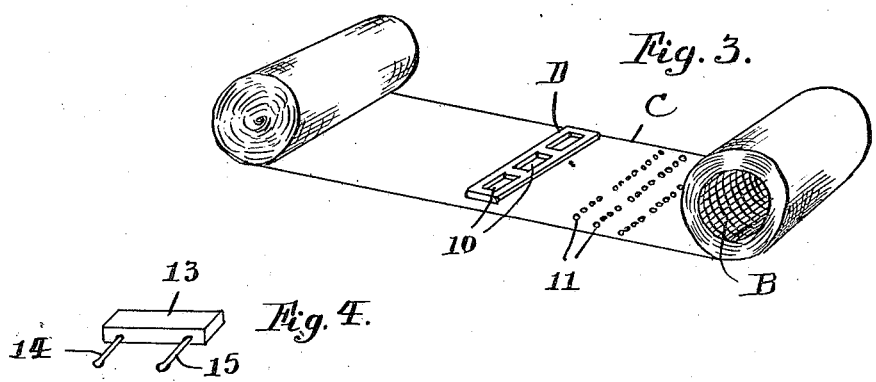
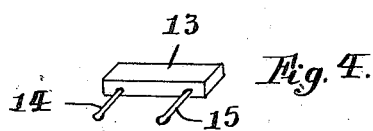
Inventor:
Jay Waldemar Lawton,
by: Attorney.

UNITED STATES PATENT OFFICE.

JAY WALDEMAR LAWTON, OF WABASHA, MINNESOTA, ASSIGNOR TO WEBB PUBLISHING COMPANY, OF ST. PAUL, MINNESOTA, A CORPORATION OF MINNESOTA.

SEED-TESTER.

1,295,530.  Specification of Letters Patent.  Patented Feb. 25, 1919.

Application filed June 24, 1918. Serial No. 241,566.

*To all whom it may concern:*

Be it known that I, JAY WALDEMAR LAWTON, a citizen of the United States, residing at Wabasha, in the county of Wabasha and State of Minnesota, have invented a new and useful Improvement in Seed-Testers, of which the following is a specification.

The object of this invention is to provide means for testing seed corn, whereby a maximum amount of corn can be accurately tested for seed purposes in a minimum length of time and in an inexpensive manner.

A further object is to provide a tester which can be so regulated that the seed is tested under substantially the same conditions in which it is expected to grow.

With these and other objects in view, my invention comprises the features of construction and combination of parts hereinafter described and claimed.

In the accompanying drawing forming part of this specification, Figure 1 is a perspective of my improved seed corn tester, part of the receptacle being broken away for the purpose of exposing the interior structure; Fig. 2 is a perspective of the wire screen cylinder employed with my invention; Fig. 3 is a perspective of the wrapper in which the corn is placed, said wrapper being shown formed from a roll of absorbent material and the seed corn spotter shown in position on the inner face of the wrapper, and Fig. 4 is a perspective of the sampler which is used for removing kernels from near the butt and tip ends of the cob for testing purposes.

My invention comprises a receptacle A of suitable configuration that illustrated having a cylindrical wall 2, a floor 3 and a removable cover 4, said cover fitting closely into the top of the receptacle and having a handle 5 and a down draft perforation 6 near its center. The floor 3 is provided with legs 7 by which the receptacle is supported in elevated position and is formed with an upwardly projecting combination duct and weir 8 near its center through which the air from the receptacle may egress downwardly and out. This duct also limits the depth of water which may be maintained in the receptacle. The cylindrical wall 2 also has perforations 9, which being at substantially the same height as the upper edge of the duct 8 serves to limit the depth of water in the receptacle and aid circulation of air downwardly and out. A cylinder B is provided made of reticulated material such as galvanized wire screening which is of larger diameter than the diameter of the duct 8, so as to fit freely thereover and stand endwise on the floor 3. This cylinder of reticulated material performs the function of an open mesh core on which a strip of flexible absorbent material C forming a wrapper may be wound. This strip is a little wider than the length of the core, and it is wound upon said core with its side edges projecting beyond both ends thereof as illustrated in Fig. 3. As the strip is wound upon the core kernels of corn to be tested are arranged by means of a spotter D, which has a plurality of suitable openings 10 therein in which the seeds 11 to be tested may be placed and by which they are arranged in rows of groups, so that the seeds can be rapidly and selectively placed upon the wrapper. As the seeds or kernels are placed on the inner face of the wrapper, the wrapper is rolled upon the core until all of the seeds to be tested have been placed and the wrapper completely rolled. The ends of the wrapper may then be tied by cords 12 and the bundle placed with one end of the core over the duct 8 and the adjoining end of the wrapper depending into the water in the bottom portion of the receptacle. The wrapper is left standing in the receptacle in the position mentioned and the cover closed over the receptacle as illustrated in Fig. 1. The moisture which is absorbed from the water in the bottom of the receptacle is evenly distributed throughout the absorbent material and air circulates freely downwardly through the core and through and around the wrapper passing outwardly through the openings 9 and the duct 8. The seeds held in the wrapper soon germinate and start growing and the wrapper is then removed and unrolled and the test can easily be determined and the ears of corn from which the sample seeds have been removed graded according to the test. In choosing the seeds from the ears to be tested a sampler having a handle member 13 and a pair of picks 14 and 15 can be employed for removing sample kernels near the butt and near the tip of each ear in a single operation, said sample kernels being subsequently placed in groups in the wrapper in consecutive order according to the ears of corn from which they have been removed and a record kept so that subsequently the kernels and the ears from which they have been removed can be identified.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim.

Having described my invention what I claim as new and desire to protect by Letters Patent is:—

A seed corn tester comprising in combination a receptacle having a removable cover, an upwardly projecting combination duct and weir in its floor and air ingress and egress openings respectively in said cover and in the side of said receptacle spaced above said floor, said receptacle thus forming a shallow liquid holding pan, a reticulated hollow core adapted to be placed with one end over said duct and weir and a strip of absorbent material formed in a roll on said core in which the seed to be tested may be placed and held between its wraps, said roll projecting by its lower end into liquid in the pan in the bottom of said receptacle, whereby the strip and seeds held thereby are moistened and fresh air is circulated downwardly through the laps of said roll and outwardly through said duct and weir and said side perforations.

In testimony whereof, I have signed my name to this specification.

JAY WALDEMAR LAWTON.

Copies of this patent may be obtained for five cents each, by addressing the "Commissioner of Patents, Washington, D. C."